April 5, 1955  A. J. SICILIANO  2,705,474
AUTOMATIC FEEDER FOR POULTRY AND THE LIKE
Filed Oct. 7, 1953
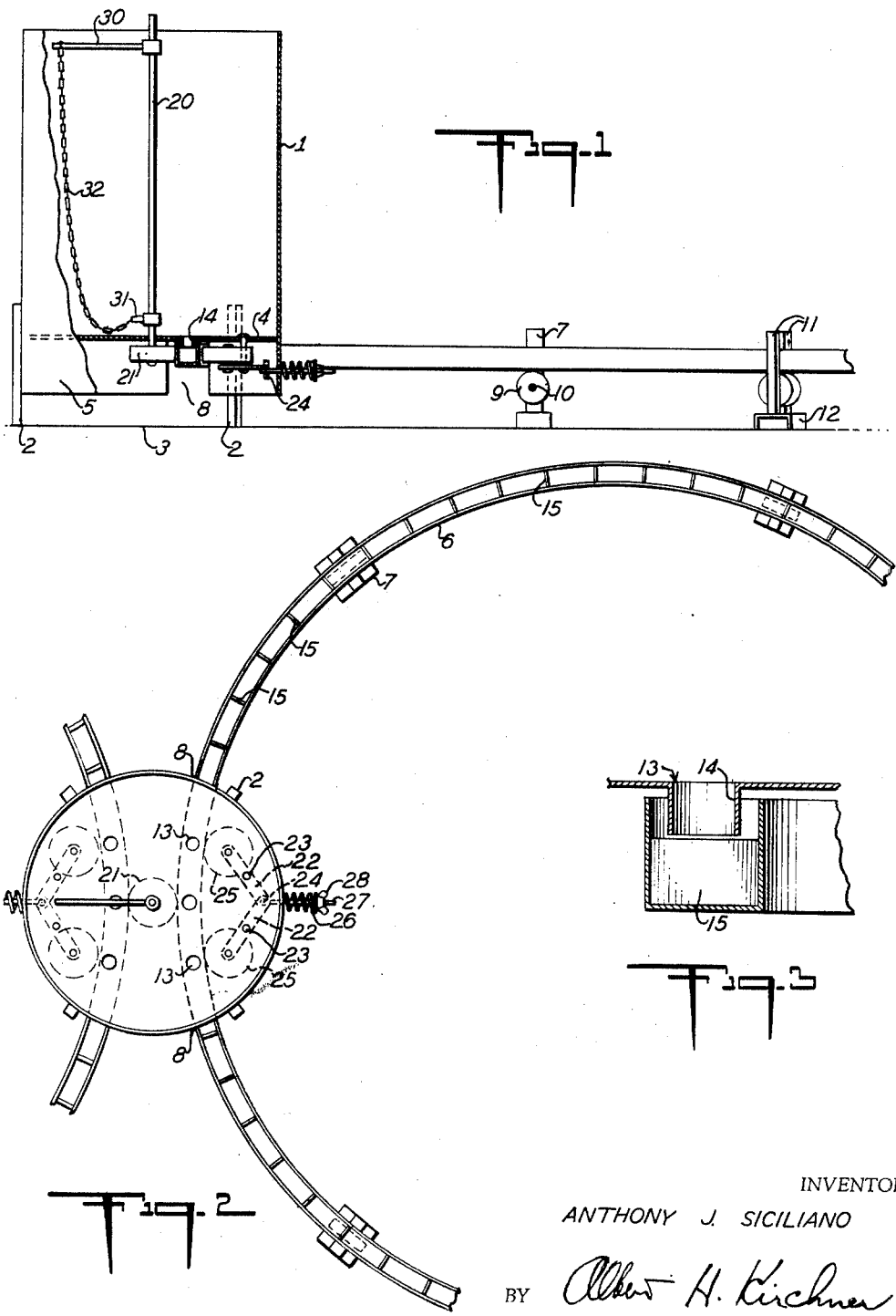
INVENTOR
ANTHONY J. SICILIANO
BY Albert H. Kirchner
ATTORNEY

2,705,474

AUTOMATIC FEEDER FOR POULTRY AND THE LIKE

Anthony J. Siciliano, Vineland, N. J., assignor to Everett M. Keen, Vineland, N. J.

Application October 7, 1953, Serial No. 384,747

9 Claims. (Cl. 119—52)

The present invention relates to feeders for poultry and the like, and its principal object is to provide a simple, inexpensive and efficient mechanism comprising a bin or hopper discharging into a trough conveyor for supplying feed, continuously during operation of the mechanism, to the poultry or other stock to be fed.

The invention comprises essentially an endless open trough conveyor which is driven in a circuit passing beneath the discharge outlet of a hopper so that feed will issue from the hopper into the conveyor and be conducted, on continuing movement of the conveyor, out from beneath the hopper to points in the conveyor circuit where it will be accessible to the animals.

Incidental objects of the invention are concerned with insuring constant and uniform discharge of the feed, prevention of overflow and spillage from the conveyor as well as from the hopper, a single drive means for operating both the conveyor and an agitator in the hopper, and other and further advantages that will be apparent to those skilled in the art from the accompanying drawing which shows a preferred embodiment of the invention and the following specification which describes it.

In the drawing,

Figure 1 is a side elevational view, partly broken away, showing the novel combination of hopper and trough;

Fig. 2 is a top plan view, partly broken away, showing a modification or development of the invention; and Fig. 3 is a detail sectional view on a larger scale showing the relationship of hopper discharge and conveyor.

In the drawing the reference numeral 1 designates an upright hopper for containing poultry feed or the like. It is preferably cylindrical in shape and is supported by short legs 2 which space the lower edge of the hopper slightly above the ground or floor 3.

The hopper is conveniently made of sheet metal, with the legs of bar, angle or channel stock welded, riveted, soldered, bolted or otherwise secured to the hopper wall. A bottom closure 4 is secured in the hopper slightly above the bottom edge of the side wall, which projects below the bottom 4 as a depending skirt 5.

An endless trough 6, in the present instance shown as a rigid circular ring of metal which is channel shaped, is mounted on a plurality of supports 7 positioned on the floor 3 equidistantly around the trough, and the trough is so related to the hopper 1 as to project through a pair of openings 8 formed in the depending skirt 5 and to occupy an arcuate path between the openings, as shown by the broken lines in Fig. 2 along the under side of the hopper bottom 4. The hopper legs 2 and the trough supports 7 are so proportioned that the arcuate segment of the trough which underlies the hopper bottom 4 will be maintained closely up against the under side of the bottom in substantially engaging relation therewith. Adjustment for this purpose, and rotatability of the circular trough about its center, are provided by journaling a horizontal roller at vertically adjustable positions in each of the supports 7, as best shown in Fig. 1. This arrangement may take the form of a simple metal roller 9 having pintles 10 projecting axially from its ends and journaled in selected pairs of bearing holes formed in the spaced standards 11 which rise from the base 12 of each support 7.

The hopper bottom 4 is provided with one or more openings, such as the three shown at 13 in Fig. 2, immediately above the arcuate path occupied by the subjacent trough segment for discharge of material from the hopper into the trough. If desired or thought necessary the openings 13 may be valved or otherwise provided with adjustable closures for regulating the effective size of the openings and hence the rate of discharge through them. However, this has been found generally unnecessary if, as preferred, the openings be provided with short depending spouts 14 which project appreciably into the confines of the trough, almost to the level of the top surfaces of transverse partitions 15 which are fixed in a spaced series in the trough. Fig. 3 shows the relationship of spout and partition, and Fig. 2 shows the arrangement of partitions in the trough. It will be appreciated that when the trough is rotated about its center feed issuing from the spout or spouts 14 will fill the trough between adjacent pairs of partitions 15 and that on rotation of the trough successive movement of partitions past the spouts will tend to cut off the discharge through the spouts and hence limit the height of feed in the trough. Thus the feed level is kept low enough below the top of the trough side walls to prevent overflow and to minimize waste during consumption by the animals as will be hereinafter pointed out.

The trough is driven in rotation about its center at a slow rate of speed by any convenient means. As shown in the drawing, this means may comprise a vertical shaft 20 extending axially through the hopper 1, in which it may be mounted in any suitable bearings, and projected through the hopper bottom 4. On the lower projecting end of the shaft a drive roller 21 is made fast, so that when the shaft is rotated, as by a motor arrangement (not shown) at its upper end, the roller 21 will turn in engagement with the outer periphery of the trough 6 and thus rotate the trough.

To hold the trough frictionally engaged with the roller 21 and to stabilize the assembly it is convenient to provide a pressure mechanism such as that shown in Figs. 1 and 2. This may comprise a pair of levers 22, each pivoted to the trough bottom 4 at 23, with their outer ends pin-connected at 24 and with an idler roller 25 carried on its inner end. Each idler roller is yieldably pressed against the inner periphery of the trough by the expansion force of a coil spring 26 mounted around a screw 27 which is connected to the pin 24 and extends through a hole in the hopper skirt 5. A wing nut 28 threaded on the screw 27 cooperates with the hopper skirt to provide an abutment for the spring and acts as a means for adjusting the tension with which it presses the rollers 25 against the trough and hence presses the trough frictionally against the drive roller 21.

Because the type of feed with which the apparatus is frequently used tends to pack and arch in the hopper, it is convenient to provide an agitator to be driven by the shaft 20. A preferred form of such an agitator comprises an upper relatively long radial arm 30, a lower relatively short radial arm 31, both fast on the shaft 20, and a chain 32 loosely hung from the upper arm and connected to the lower one, so that when the shaft rotates the chain will be dragged through the hopper contents to prevent all tendency to pack and arch and insure steady discharge through the openings 13.

The invention has been illustrated and described in a preferred form of embodiment which has been found entirely satisfactory in actual use. However, within the scope of the broader of the appended claims the invention may be modified in various details and by omission of certain of the elements of the preferred embodiment. Thus, as has been explained, the openings 13 may be equipped with valves. The trough and the drive roller 21 may be positively meshed by providing each with gear teeth. Indeed, while rigid circularity is preferred for the trough, it is possible to use a flexible trough, for example one made of rubber or its equivalent, in which case the trough may be mounted for linear movement in a path that is not circular, but which will include a section trained through the openings 8 and lying directly beneath the opening or openings 13.

Furthermore, while for the sake of simplicity the structure has been described as shown in Fig. 1, with only one circular trough combined with the hopper 1, it will be noted from the showing in Fig. 2 that it is possible, for use in larger poultry raising enterprises, to supply a pair of feed troughs from a single hopper. Both troughs can be driven from the same motor and the same drive roller, and the only change required in the hopper structure of Fig. 1 is the making of additional openings 8 and 13 and the installation of another assembly including a pair of idler rollers 25, as will be understood. Of course the fact that the two troughs are rotated in opposite directions is immaterial.

Other changes, additions and omissions may be made, without departing from the spirit of the invention, as will be understood by those skilled in the art.

I claim:

1. A feeder for poultry and the like comprising a relatively fixed upright feed hopper having a bottom provided with a discharge outlet, a rigid endless trough formed in circular shape about a center point outwardly beyond the hopper, bearings supporting the trough in a horizontal plane with an arcuate segment only of the trough underlying the hopper for receiving material from said outlet and with the major portion of the trough disposed beyond the hopper, and means rotating the trough on said bearings to move successive arcuate segments thereof into material-receiving relation with said outlet.

2. A feeder for poultry and the like as claimed in claim 1 including a vertical driven shaft having a portion disposed beneath the hopper and drive means carried by said portion and engaged with said arcuate segment of the trough for rotating the trough.

3. A feeder for poultry and the like as claimed in claim 1 including a driven shaft extending vertically through the bottom of the hopper, drive means carried by the portion of said shaft disposed beneath said bottom and engaged with said arcuate segment of the trough for rotating the trough, and agitating means carried by the portion of the shaft within the hopper.

4. A feeder for poultry and the like as claimed in claim 1 including a pair of spaced apart discharge outlets and a pair of troughs, each cooperating with one of said outlets.

5. A feeder for poultry and the like as claimed in claim 1, including a spout forming said outlet and projecting into the trough, and a plurality of spaced transverse partitions in the trough below the level of the sides of the trough for successively substantially engaging the spout as the trough rotates so as to limit the height of feed discharged into the trough.

6. A feeder for poultry and the like as claimed in claim 1, in which the hopper is substantially cylindrical and the means driving the trough comprises a rotatable shaft extending axially through the hopper and terminating below the hopper in a drive roller engaging the trough.

7. A feeder for poultry and the like as claimed in claim 1, in which the hopper is substantially cylindrical and the means driving the trough comprises a rotatable shaft extending axially through the hopper, having means connected to its portion within the hopper for agitating the hopper contents and having a roller fast on its portion below the hopper engaging the trough.

8. A feeder for poultry and the like as claimed in claim 1, in which the hopper is substantially cylindrical and the means driving the trough comprises a rotatable shaft extending axially through the hopper and terminating below the hopper in a drive roller engaging one side of the trough, in combination with roller means beneath the hopper and yieldably pressed against the opposite side of the trough for maintaining said drive roller in driving engagement with the trough.

9. A feeder for poultry and the like as claimed in claim 1, in which the hopper is substantially cylindrical and the means driving the trough comprises a rotatable shaft extending axially through the hopper and terminating below the hopper in a drive roller engaging one side of the trough, in combination with means projecting from the shaft portion within the hopper for agitating the hopper contents on rotation of the shaft, and roller means beneath the hopper and yieldably pressed against the opposite side of the trough for maintaining said drive roller in driving engagement with the trough.

References Cited in the file of this patent

UNITED STATES PATENTS

| | | |
|---|---|---|
| 2,369,529 | Buckholdt | Feb. 13, 1945 |
| 2,591,609 | Roberts et al. | Apr. 1, 1952 |
| 2,622,724 | Slama | Dec. 23, 1952 |

FOREIGN PATENTS

| | | |
|---|---|---|
| 453,262 | France | Mar. 31, 1913 |

OTHER REFERENCES

Successful Farming Publication, March 1954.